April 13, 1954

J. S. SCHNEIDER ET AL 2,674,783

METHOD OF PRODUCING AXLE HOUSINGS

Filed Sept. 3, 1949

INVENTORS
Walter F. Rockwell
Lawrence R. Buckendale
John S. Schneider

By *Strauch, Nolan + Diggins*

Attorneys

April 13, 1954       J. S. SCHNEIDER ET AL       2,674,783
METHOD OF PRODUCING AXLE HOUSINGS
Filed Sept. 3, 1949       5 Sheets-Sheet 2

INVENTORS
Walter F. Rockwell
Lawrence R. Buckendale
John S. Schneider
By Strauch, Nolan & Diggins
Attorneys April 13, 1954  J. S. SCHNEIDER ET AL  2,674,783
METHOD OF PRODUCING AXLE HOUSINGS
Filed Sept. 3, 1949  5 Sheets-Sheet 3

INVENTORS
Walter F. Rockwell
Lawrence R. Buckendale
John S. Schneider
By Strauch, Nolan & Diggins
Attorneys April 13, 1954   J. S. SCHNEIDER ET AL   2,674,783
METHOD OF PRODUCING AXLE HOUSINGS
Filed Sept. 3, 1949   5 Sheets-Sheet 4

INVENTORS
Walter F. Rockwell
Lawrence R. Buckendale
John S. Schneider
By Strauch, Nolan + Diggins
Attorneys April 13, 1954  J. S. SCHNEIDER ET AL  2,674,783
METHOD OF PRODUCING AXLE HOUSINGS
Filed Sept. 3, 1949  5 Sheets-Sheet 5

INVENTORS
Walter F. Rockwell
Lawrence R. Buckendale
John S. Schneider

By *Strauch, Nolan & Diggins*

Attorneys

Patented Apr. 13, 1954

2,674,783

UNITED STATES PATENT OFFICE 2,674,783

METHOD OF PRODUCING AXLE HOUSINGS

John S. Schneider, New Hartford, N. Y., and Walter F. Rockwell and Lawrence R. Buckendale, Detroit, Mich., assignors, by mesne assignments, to Rockwell Spring and Axle Company, Coraopolis, Pa., a corporation of Pennsylvania Application September 3, 1949, Serial No. 113,986

3 Claims. (Cl. 29—153.1)

This invention relates to fabricated axle housings and is particularly concerned with novel methods of forming blanks of sheet steel into desired shape for welded assembly into an axle housing having maximum strength with minimum weight.

It has heretofore been proposed to fabricate axle housings from sheet metal, but the present invention embodies special forming features that are novel and commercially useful.

In the present invention, two opposite halves of the axle housing are similarly formed, being pressed from flat steel blanks in successive breakdown and finish operations, during the latter of which the spring seat regions are stoved to provide thickened substantially rectangular densified corner regions. The two axle housing halves are then welded along mated horizontal edges to complete assembly of the center section of the axle housing, and then the axle assembly is completed in a known manner. The invention is applicable to tubular idle axle housings as well as to drive axle housings.

It is a major object of our invention to provide a method of fabricating an axle housing wherein individual similar longitudinal halves of a section of the housing are each hot forged from single blanks of sheet steel in successive novel breakdown and finish operations.

A further object of our invention is to provide a novel method of fabricating an axle housing center section member wherein a blank of sheet steel, trimmed and cut to predetermined size and contour and containing adequate metal, is subjected to a breakdown operation during which the axle housing member is given approximately its final form and then subjected to a hot forging finish form operation wherein the side walls are stoved to provide thickened corner spring seat regions.

It is a further object of our invention to provide a novel method of fabricating an axle housing member wherein a preformed blank of sheet steel is placed in a breakdown die assembly shaped to enable hot forging of the steel to approximately its final shape and the partially completed member is moved to a finish form die assembly where it is subjected to a finishing operation wherein the side walls are stoved to provide flat outer spring seats having thickened squared dense metal corners.

It is a further embodiment of our invention to provide a novel process of fabricating a drive axle housing member wherein a heated preformed blank is rough formed to a channel section substantially U-shaped along its length and having an arcuate differential encompassing section and then subjected to a finish operation wherein the side walls are upset to form substantially rectangular cornered flat spring seat areas near the outer ends.

It is a further object of our invention to provied a novel method of fabricating an axle housing wherein a preformed blank of sheet steel is hot forged to a substantially channel section throughout its length and the opposite side edges of the channel are simultaneously stoved to final form and scarfed to provide for welding of mated housing members together to form a complete axle housing center section.

Further objects of the invention will appear as the description proceeds in connection with the appended claims and the annexed drawings wherein:

Referring to Figures 1-4, which illustrate a commercial embodiment of a drive axle housing fabricated according to our invention, the axle housing center section 11 comprises identical upper and lower half members 12 and 13 which are channel-shaped in cross section along their entire length with their abutting adjacent side wall edges welded together along a straight substantially horizontal region 14.

Figures 2, 3, 3A, 4, 5:
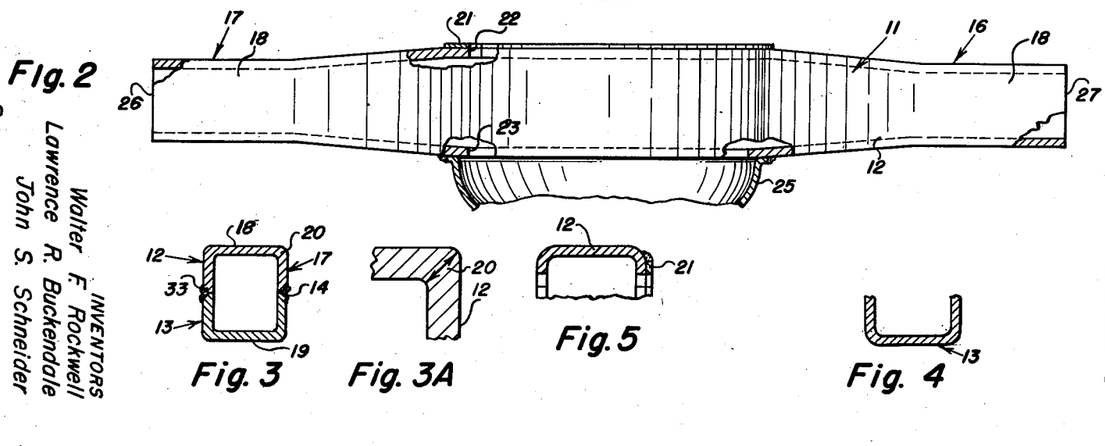
Figure 2 is a top plan view, partly in section, of the center section of the axle housing assembly of Figure 1.
Figure 3 is a section substantially on line 3—3 of Figure 1, illustrating the thickened rectangular corners at the spring seat regions and also the scarfed adjacent edges of the housing halves where they are welded together.
Figure 3A is an enlarged fragmentary section illustrating the thickened square spring seat corners.
Figure 4 is a fragmentary section along line 4—4 of Figure 1 illustrating the rounded corners of each axle housing member in its transitional region.
Figure 5 is a fragmentary section on line 5—5 of Figure 1 illustrating the carrier flange.

The axle housing center section comprises an enlarged intermediate differential receiving region 15 which is rounded, being substantially circular, with the ends of the axle housing center section member being oppositely extending axle arms that terminate in spring seat regions indicated at 16 and 17 wherein the tubular axle arm is of substantially rectangular cross section as illustrated in Figure 3. Between the differential receiving region and these substantially rectangular spring seat regions, the axle housing members are of changing cross section, one section being substantially as illustrated in Figure 4; the side walls and corners being of substantially uniform thickness.

As illustrated in Figure 3, each spring seat region is substantially rectangular, with its longer sides vertical and with flat upper and lower sides 18 and 19 of adequate area for attachment of the springs without the necessity for special spring pads. The elimination of separate spring pads eliminates the need for bolt or rivet holes in the axle housing, thus retaining the integral metal strength of the housing.

In the process of fabrication later to be described, the side walls of the housing half members at the outer spring seat regions are stoved by a hot forging operation while being confined in suitable die assemblies to produce the squared corner cross section of Figure 3. The blank contains any excess metal necessary to fill out the die spaces, and the resultant reinforced corners, one of which is indicated at 20 in Figures 3 and 3A, are diametrically thicker than the adjacent side walls, which latter retain the thickness of the blank, and the corners contain densely compacted metal, whereby the spring seat regions besides being adequately wide are exceptionally strong in resistance to bending. The corners are as sharp as hot forging practice will permit, the drawing in Figure 3A indicating the immaterial small fillets that appear in the resultant product.

The carrier attachment flange 21 at the front of the axle center section may be stoved during the hot forging operation until it is thicker than the adjacent housing walls and contains adequate metal for tapped bolt receiving bores. However, in the illustrated embodiment, this flange 21 is a separate ring welded onto the housing center section, after the upper and lower halves are welded together, and this aids the strength of the assembly.

Circular openings 22 and 23 are provided in differential receiving region 15, with peripheral notches 24 and recesses provided in them and in flange 21 to accommodate entry of the differential and other gears of the carrier during assembly and disassembly and for support of the carrier in the assembly. A steel closure bowl 25 is welded onto the housing center section about rear opening 23 in permanent assembly, and this provides further structural strength to the axle housing.

Each end of the axle housing center section member 11 is planar, terminating in surfaces 26 and 27 that are parallel to each other and perpendicular to the longitudinal center line of the housing. A cylindrical housing sleeve boss 28, which is formed at its inner end with a coupling section 29 that is generally rectangular in cross section and substantially exactly the size and shape of the adjacent surface 26 or 27, is butt welded to each end of the axle housing center section 15 as illustrated in Figure 1 whereby the housing sleeve boss essentially comprises a permanent integral extension of the axle housing center section member 15 in the assembly.

Figure 1:
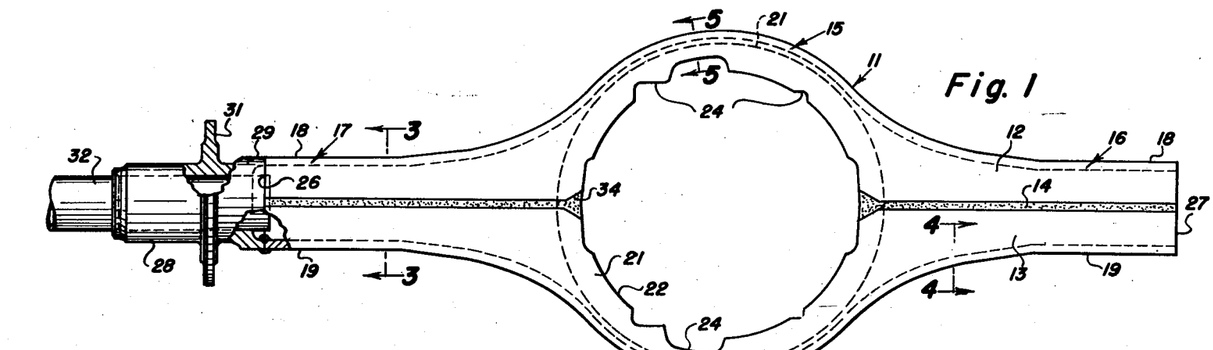
Figure 1 is a front elevation partly in section of a drive axle housing assembly according to a preferred embodiment of the invention wherein the center section is illustrated as having a welded-on housing sleeve boss and inserted wheel bearing spindle at only one end, although it will be understood that both ends of the axle are the same.

The housing sleeve boss 28 is provided with an integral brake adapter flange 31, and a cylindrical wheel bearing sleeve 32 is tightly fitted within the cylindrical bore of boss 28 as illustrated in Figure 1, this sleeve serving to support the wheel bearings (not shown) in a manner known in the art.

Referring to Figures 1, 3, 13 and 14, the adjacent side wall edges of both housing center section members 12 and 13 are scarfed as indicated at 33 to provide inclined surfaces that define wedge shaped depressions at both sides of the assembly to receive deposit metal during welding and thus enable a very efficient welded joint to be attained. This scarf 33 is formed during the stoving operation as will be later described.

Also adjacent the differential receiving region openings 22 and 23, each housing member 12 and 13 is formed with inclined scarf surfaces indicated at 34 in Figure 1 to provide wedge-shaped edge notches in the assembly to receive deposit metal for added strength in welding.

Figure 6:
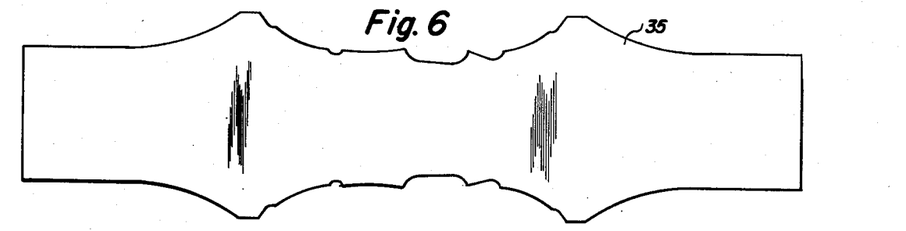
Figure 6 is a top plan view of a pre-cut blank of sheet steel from which a housing half member is fabricated according to the invention.

Figures 6-11 illustrate sequentially progress of the flat metal blank from its initial precut form to finish form. The blank illustrated in Figure 6 is a flat sheet of steel, for example the steel known as S. A. E. 1035 steel, about one-half an inch thick. For fabricating an axle housing center section member useful in a commercial drive axle, we employ for this purpose the trimmed blank 35 of the shape of Figure 6 which is about 53 inches long and 14 inches wide.

The first operation in forming the housing center section is to cut and trim blank 35, usually out of a larger sheet of metal, in a single punching operation which produces a blank of the exact contour illustrated in Figure 6, so that it is not necessary to undergo separate measuring, notching and trimming operations, as on a blank which has simply been stamped in approximate shape from the larger plate as has been the case heretofore. This operation forms the perfectly developed blank in a single operation. This precut flat blank 35 is mounted in a furnace where it is heated to approximately 1800° F. for about twenty minutes. In commercial production we employ a large rotary furnace wherein the blanks are automatically loaded and removed from the furnace on a conveyor, and after removal are scaled by water pressure.

The hot blank is now placed upon one side of a special forming assembly. A double die is preferred which, as will be later described, comprises a breakdown side or station and a finish form side or station. In the breakdown station, a descending punch rough forms the flat blank into the shape illustrated in Figures 7-9 wherein blank is longitudinally bent so that the intermediate arcuate differential receiving portion of the housing section is rough formed, and with the entire blank being bent generally transversely U-shaped with equal rounded corners where the metal is of the same thickness as the side walls throughout its length and with the notches at the openings of the differential receiving portion being located so as to appear substantially properly circumferentially spaced in a finished article.

Figures 7, 8:
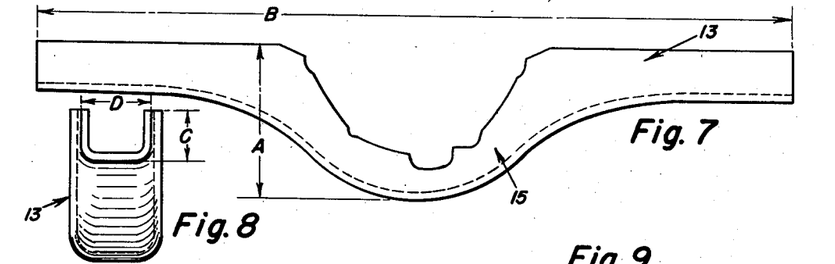
Figure 7 is a front elevation of the lower half of a drive axle housing center section member after the first or breakdown forming operation wherein it assumes substantially its final shape but is of U-shaped cross section and substantially equal wall thickness substantially throughout its entire length.
Figure 8 is an end elevation of the housing member of Figure 7.
Figure 9:
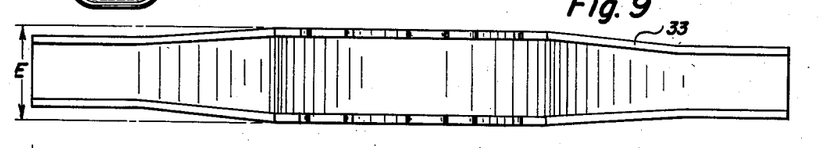
Figure 9 is a top plan view of the partially formed housing member of Figure 7.

For example, starting with the fifty-three inch long blank of Figure 6, the partially completed member 13 illustrated in Figures 7-9 is produced in the breakdown operation. Figure 7 illustrates the bowed intermediate portion 15 wherein the dimension A is about 10 inches and the dimension B is about 49⅛ inches. The depth of the partially formed spring seat region (dimension C) is about 3¼ inches, and the width of the spring seat region (dimension D) which is less than the width of the differential receiving region is about 4⅛ inches. The width across the differential receiving region of the member (dimension E) is about 6 inches, and the transition regions are of uniformly changing width between the differential receiving and spring seat regions as illustrated in Figure 9.

This breakdown operation is essentially a plate bending operation wherein the one-half inch thickness of the metal is substantially maintained at all side walls and corners and care is taken not to excessively strain the metal at the corners and other curved places. The coacting die and punch devices determine and confine the member within the above dimensions, except the length of the member.

After so attaining the preliminary form of Figures 7-9, the partially complete housing half member is moved to the finish form station on the die assembly which is substantially more shallow than the breakdown station, and here the housing half member is hot forged to the final shape illustrated in Figures 10-14.

Figures 10, 11, 12:
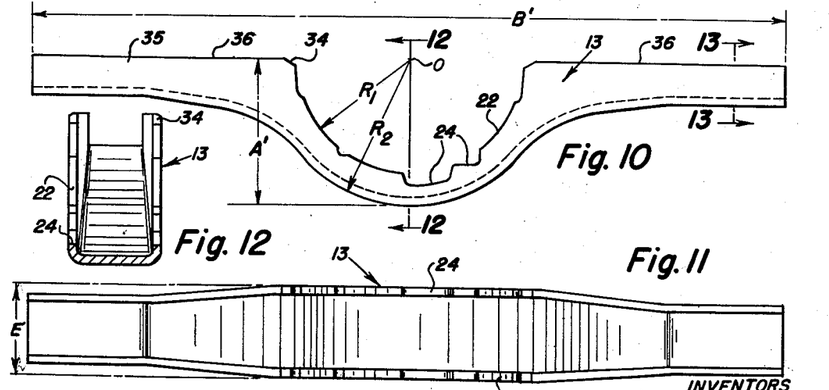
Figure 10 is a front elevation of the axle housing member of Figure 7 after it has been subjected to the second or finish forming operation during which the side walls are stoved to obtain the proper strength at the spring seat regions and also scarfed for the welding operation.
Figure 11 is a top plan view of the final axle housing center section member of Figure 10.
Figure 12 is a section on line 12—12 of Figure 10.

In the finish form operation, the overall transverse dimensions of the housing member are held the same, compare Figures 9 and 11, and the side walls of the channel are confined to retain their thickness but stoved to provide the spring seat corner reenforcements and the other final dimensions desired.

In forging the axle housing member 13 illustrated in Figures 10-14, the central portion of the punch is formed with a circular surface that engages and further bends the blank longitudinally to form the circular openings 22 and 23 concentrically about a point O that lies in the horizontal plane of the side wall edges 36 (Figure 10), the radius $R_1$, indicated in Figure 10 being about $7^{17}/_{32}$ inches, and the radius $R_2$ in Figure 10 (which is also the new dimension A') being about $9\frac{11}{16}$ inches. The surfaces described about these radii are determined by the punch and die dimensions. Usually the circular surfaces of openings between the notches 24 are later machined for accurate fit with lugs on the differential carrier.

In the illustrated form of the invention wherein the carrier flange 21 is a separate stamped ring welded onto the housing this action in finish forming the differential receiving region of the housing member is substantially pure bending, there being little or no stoving of the side walls in this vicinity. It will be noted however that the curvature of the corner between the side and bottom walls is effectively shortened in this operation, the final corners being of smaller radius but of substantially the same wall thickness as the original plate 35. This provides more space within the housing.

Figure 13:
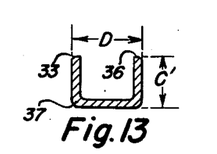
Figure 13 is a section on line 13—13 of Figure 10.
Figure 14:
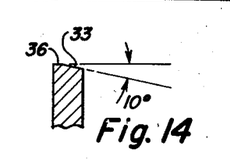
Figure 14 is a fragmentary section illustrating the scarfed upper edge of each side wall of each upper and lower housing member.

The spring seat regions of the final form are of appreciably less depth than in Figure 8, the final depth of about 2⅝ inches being indicated in Figure 13 at dimension C', dimensions D and E being held constant.

This reduction in depth of each spring seat region takes place when the side walls of the member 13 are stoved by engagement of suitable surfaces of the descending punch. The punch and female die dimensions and shape are such that the confined side wall thickness is substantially maintained and the excess metal during the stoving operation flowing into and forming the rectangular thickened corners 37. The punch and die are shaped to permit and define this thickening of the corners, and it has been found that these thickened corners contain metal which is more densely compacted than elsewhere in the housing member, although the metal in the side walls is also compacted during this operation. Thus the novel housing member of the invention is substantially rectangular along its length and is provided with substantially square spring seat corners wherein the method of forming insures that there is no stretched or otherwise strained metal but instead an excess of dense compact metal. The punch surfaces are so shaped as to form the welding scarfs 33 in the upper edges of the side walls during this operation.

Figure 15:
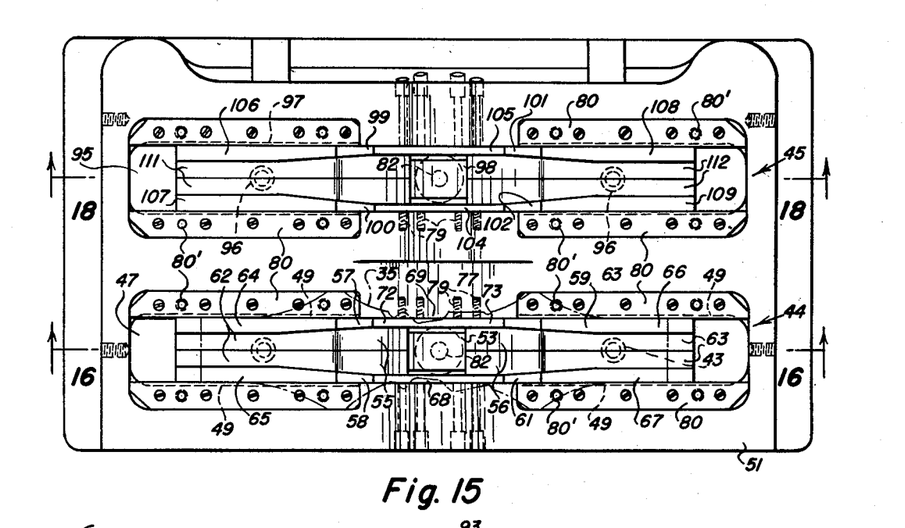
Figure 15 is a top plan view of a preferred lower or female die of the die assembly having a breakdown station and a finish form station in side by side relation whereby the blanks can be transferred through the die stations in succession for efficient fabrication of the housing member. A preformed blank is shown in phantom lines superposed as it is placed in the breakdown station ready for the first hot forging operation.

We have found it advantageous in production to utilize a double die of the type illustrated in Figure 15 whereby the partially formed housing half is removed from the breakdown side and located in the finish form side at the same time that a new flat blank is placed under the punch in the breakdown station, so that at the next press stroke a breakdown operation will be performed on the flat blank and a finish form operation will be simultaneously performed on the partially formed member. In practice, when the second member has been moved to the finish form side of the die, a third blank is placed in the breakdown side, so that on the third stroke of the press both forming operations are performed simultaneously. Then, before the fourth stroke of the press, we place the third member in the finish form side, so that on the fourth stroke of the press the third blank is finish formed. Then we blow out both dies with air pressure in order to remove scale and other impurities that may accumulate therein. We have found that this procedure of passing three blanks through this double die and then cleaning is very advantageous in production, although it will be appreciated that any arrangement of dies and punches and sequence of operation may be utilized for performing the method of the invention without departing from the spirit. The punch and die combination is preferably part of a large hydraulic press, a 2500 ton press having been used in the example.

Specific dies and punches for accomplishing the preferred embodiment of the invention will later be described in connection with Figures 15-22.

After each housing half has attained its final form illustrated in Figures 10-14, it is placed on a cooling block where it is clamped to maintain its given contour and avoid warping because of stress relief at the notches 24 about the inner peripheries of the differential receiving region. Actually each housing half is so clamped that the surfaces 36 along which the scarfs 33 are formed for welding do not lie in a single plane but each inclines slightly outwardly and downwardly from the differential receiving region so as to be higher adjacent the center opening than at the ends, so that two matched halves when brought together to the position illustrated in Figure 1 before clamping for welding would have the surfaces 36 touching substantially only adjacent the periphery of the differential receiving opening and separated as much as a quarter of an inch adjacent the outer edges of the housing center section, an arrangement which is preferable for ideal welding conditions as when the two housing sections are clamped together in the welding fixture considerable leverage can be exerted at the outer ends to bring the surfaces 36 together along their entire lengths for welding them to each other, whereby the weld 14 will be a straight horizontal line with the parts held together in perfect assembly.

After cooling, each housing half member is washed in a caustic bath to remove the graphite lubricating agent used in the forming operations and to prepare it for the pickling operation. The formed housing half members are pickled to remove scale and then are placed in the stock pile.

Preferably housing halves are selected from the stock piles, substantially matched and clamped together to provide welding conditions above described and each pair so selected is clamped on a seam welder where the horizontal weld 14 is applied.

In production, we provide a seam welding station wherein after two matched halves have been loaded and clamped onto the station we seam weld one side of the assembly. In the meantime, two other matched halves have been loaded and clamped on the other side of the station. We then reverse the station and seam weld the outside of the housing at the second station. Then we reverse both housings and weld the opposite sides in order, thereby completing a sequential arrangement that is time saving.

After each pair of matched halves has been welded together to provide a complete center section, we remove the welded assembly and grind the carrier face and the bowl attachment face at opposite sides to remove high spots and to provide for welding on of reinforcement ring 21 on the carrier side and to provide for welding on the bowl 25 at the rear side of the housing center section.

Referring now to Figures 15-20, the female or lower die member 41 is a heavy metal block mounted on a suitable press bed 42 and positioned thereon by knockout pins (not shown) extending through top counterbored bores 43 in member 41 and bed 42 into engagement with an air cylinder (not shown) mounted below bed 42. Die member 41 contains in side by side relation a breakdown station cavity 44 and a finish form cavity station 45, each of the same length and width.

Figure 16:
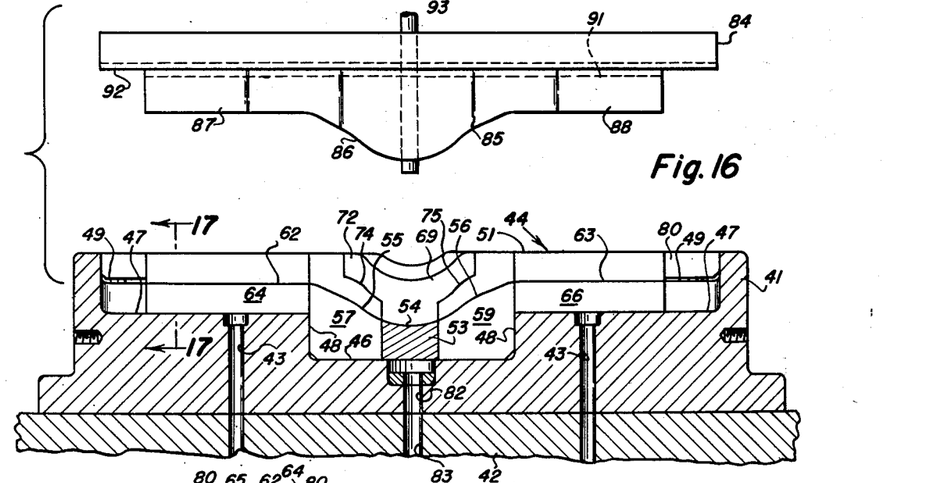
Figure 16 is a side view of the die assembly with the upper die or punch in elevation and with the lower die of the assembly in section substantially along line 16—16 of Figure 15 for illustrating the breakdown side of the assembly.
Figure 17:
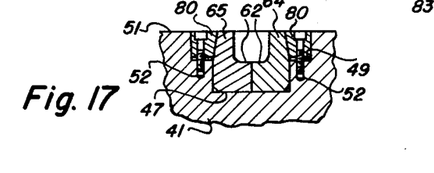
Figure 17 is a fragmentary section on line 17—17 of Figure 16.
Figure 18:
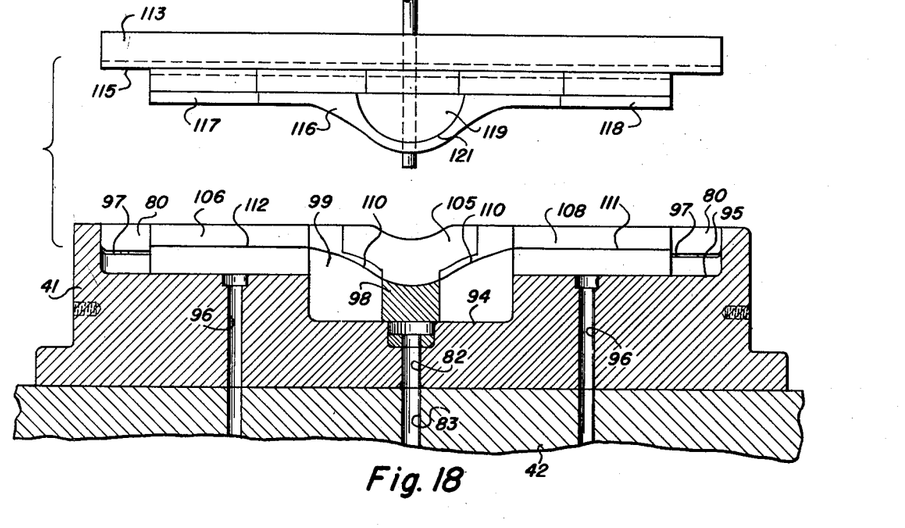
Figure 18 is a side view at the finish form side of the die with the finish form punch in elevation and the lower die shown in section substantially along line 18—18 of Figure 15.
Figure 19:
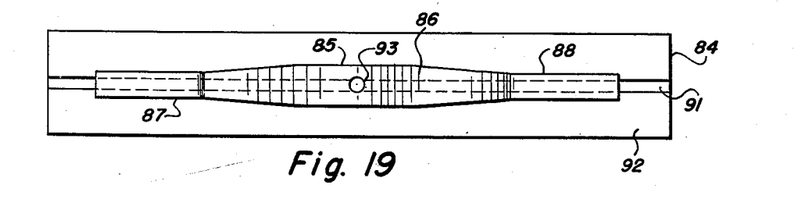
Figure 19 is a bottom plan view of the breakdown punch.

Cavity 44 is rectangular in plan (Figure 15) and comprises a two level floor, a central horizontal lower floor section 46 and two coplanar higher end floors 47 as illustrated in Figure 16. Floor sections 46 and 47 are joined with sharp corners by vertical walls 48. The cavity is several inches longer than the longest housing member to be forged therein. Adjacent and alongside each upper floor 47, horizontal shelves 49 are provided which are recessed into the horizontal top wall 51 of die member 41.

The breakdown die surfaces which accomplish the hot forging operation are in the present embodiment of the invention the upper surfaces of a plurality of hard steel blocks that are secured in cavity 44. It will be appreciated that a single die member or even a permanent die surface could be provided in the cavity, but the block arrangement to be described permits flexibility of practice of the process of the invention and enables special and different shapes and sizes of blanks to be forged by suitable choice of blocks.

Centrally of the cavity 44, a kicker block 53 is mounted flat on floor 46. As illustrated in Figure 16, the upper surface 54 of this block 53 is smooth and arcuate. Surface 54, at opposite sides, merges into the reversely turned smooth arcuate aligned surfaces 55 and 56 respectively of ham block sets 57, 58 and 59, 61. These four ham blocks are diagonally identical and interchangeable and their flat bottoms rest on floor 46.

The upper ends of surfaces 55 and 56 respectively merge into the flat smooth horizontal upper surfaces 62 and 63 of end block sets 64, 65 and 66, 67 which have flat bottoms seated on upper floors 47. Blocks 64 and 67 are interchangeable, as are blocks 65 and 66.

Figure 21:
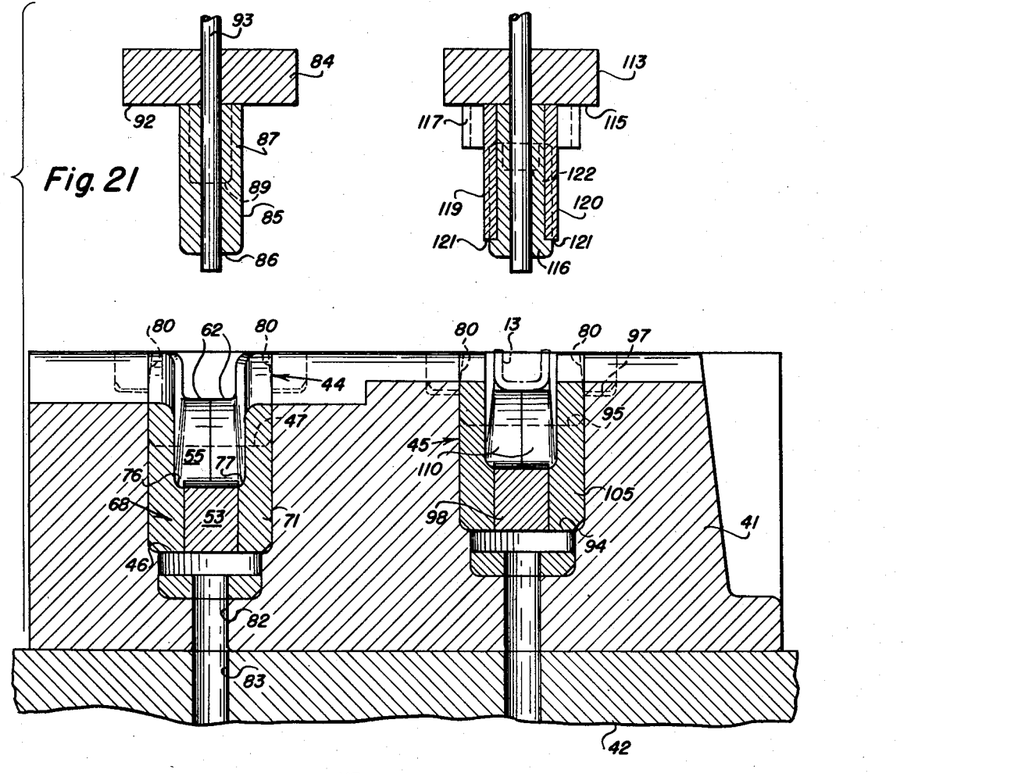
Figure 21 is an enlarged end view in cross section substantially through the center of the die assembly illustrating further details of the punch and lower die construction at both the breakdown and finish form stations.

Side blocks 68 and 69 complete the assembly. As illustrated in Figures 15, 16 and 21, each side block has a base 71 resting on floor 46 on an opposite side of kicker block 53, and longitudinally extending wings 72 and 73 that interfit with recessed portions 74 and 75 respectively of the associated ham blocks. Aprons 76 and 77 extend inwardly from side blocks 68 and 69 respectively to merge with opposite sides of kicker block surface 54, these aprons also being arcuate longitudinally to merge with surfaces 55 and 56 on the ham blocks.

It is observed therefore that block surfaces 62, 55, 53, 76, 77, 56 and 63 define the smooth bottom face of the die and the vertical die walls that arise from these surfaces give the formed blank the shape in plan illustrated in Figure 9.

Screws inserted in bores 79 provide means bearing against the flat side walls of side plates 68 and 69 and may be tightened to clamp all of the blocks seated on floor 46 in tight assembly. The upper floor blocks are clamped in place by suitable wedge bars 80, having inwardly and upwardly tapering inner walls (Figure 17) designed to engage similarly tapering wall sections formed on the upper floor blocks. Suitable studs in tapped holes 52 of shelves 49 secure bars 80 in place and provide the necessary clamping pressure to tightly clamp the upper floor blocks in place. Tapped holes 80' in bars 80 are provided for receiving limit gages and blank positioning devices to center various length blanks and receiving lift out bolts or the like. Below kicker block 53, a central top counterbored bore 82 communicating with a bore 83 in the press bed receives a knockout pin (not shown) to be applied to the bottom of block 53 and together with the knockout pins in bores 43 serves to eject the formed housing member when desired.

Figure 20:
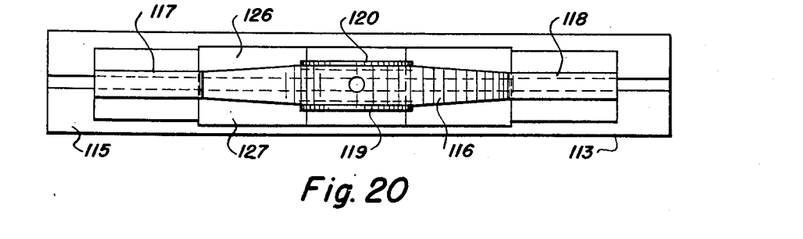
Figure 20 is a bottom plan view of the finish form punch.

The punch or upper male die member at the breakdown side is illustrated in Figures 16, 20 and 21. Its function is to bend the hot blank 35 into the form of Figures 7-9 by a single stroke toward the lower die member, the blank being horizontally supported above the die face as illustrated in phantom lines in Figure 15.

This punch comprises a holder 84 which is a rectangular flat metal plate that is wider than cavity 44 but of the same length. On the flat bottom of plate 84 is secured a central punch member 85 that has on its bottom an arcuate surface 86 of substantially the curvatures 55, 54, 56 in the lower die face. The length of punch member 85 is equal to the distance between the vertical walls 48 in cavity 44 and its end portions have the same taper as the side walls of the ham block sets.

Two end punch members 87 and 88 are secured to the bottom of holder 84 at opposite ends of central punch member 85. These are rectangular in cross section with horizontal flat bottom surfaces 89, and they enter the spaces between the end blocks of the lower die when the forging operation is made.

Preferably these punch members are aligned longitudinally by a rabbeted fit with a central rib 91 on the bottom of holder plate 84. This rib, see Figure 16, is preferably planed off level with the flat horizontal underface 92 of holder plate 84 beyond the ends of the punch members.

The entire punch assembly slides vertically by means (not shown) on a central guide rod 93 which is centered with kicker block 53. The lateral dimensions of punch members 85, 87, and 88 are sufficiently smaller than the lateral dimensions of the die cavity of the same shape there beneath to be separated at each side by the normal thickness of the metal being forged. The stroke of the punch is such that the punch members enter the spaces between the die blocks until the lower surfaces of the punch members are separated from the die face substantially only by the thickness of the metal plate being formed. This is accomplished in a single punch stroke.

At the finish form side of the die member, Figures 15, 18, 20 and 21, the cavity 45 is provided with a central low floor 94 and horizontal upper floors 95, and countersunk studs 96 help secure the lower die member to the support. Floors 94 and 95 are less deep than the corresponding floors 46 and 47 at the break-down side, but the shelf recesses 97 at opposite sides are of the same depth as shelves 49.

Seated on floor 94 are kicker block 98, ham blocks 99—102, and side blocks 104 and 105. Seated on floors 95 are the end blocks 106—109. These blocks are generally similar to the corresponding blocks of the breakdown cavity but provide a shallower die cavity and certain different forming operations as will appear.

The smooth die face 120 (Figure 18) provided by merging surfaces of the blocks on floor 94 is of circular curvature in the middle and then reversely curved to merge with the horizontal flat surfaces 111 and 112 on the end blocks. These surfaces 110—112 provide the bottom die face that underlies the partially formed member transferred from the breakdown station, and the lateral dimensions of the die face cavity are the same as in the breakdown die face cavity so that the action of the finish form punch will be confined to some longitudinal bending at the center and stoving at the ends, as will appear.

The finish form punch comprises a holder plate 113 of the same size as plate 84 and having a flat bottom face 115. Depending from face 115 is a central punch member 116 that tapers laterally at its ends to merge into recangular end punch members 117 and 118. These punch members are generally the same as those of the breakdown station.

The opposite sides of the central punch member 116 are recessed to receive side plates 119 and 120 (Figures 20 and 21) that provide circular punch faces 121 adapted to engage the inner peripheries of the differential receiving opening of the partially formed housing member and forge the same to the required circular curvatures of openings 22 and 23.

Figure 22:
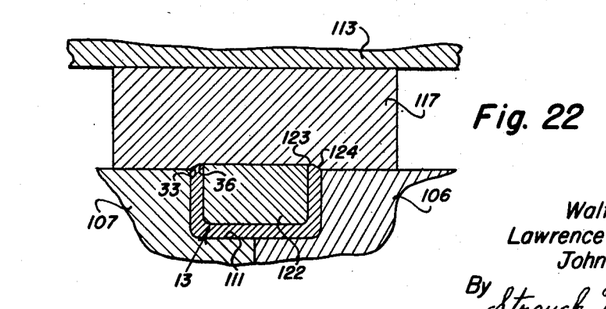
Figure 22 is a fragmentary section illustrating the stoving action in the finish form station.

Referring to Figure 22, the end punch members each comprises a depending substantially rectangular portion 122 adapted to enter the end or spring seat region of the axle housing member that lies in the die cavity therebeneath and stoving shoulders adapted to engage the upper edges of the housing member side walls. These stoving shoulders each comprises a horizontal face 123 and an inclined face 124 that scarfs the edge of the side wall as above described. Similar lateral stoving shoulders 126 and 127 that are formed to scarf the edges of the side walls up to the central opening of the housing member are also provided on the central punch member as illustrated.

When the finish form punch descends, the openings 22 and 23 are formed by punch surfaces 121 and the side walls are stoved at the end spring seat regions as illustrated in Figure 21 wherein the partially formed end regions shown in Figure 8 are confined between the punch and die members, and the housing member side walls are stoved so that the excess metal from the side walls, that are shortened vertically by the punch operation, is permitted to flow and fill the rectangular corners of the die space as illustrated in Figure 21. The side walls and the thickened square corners are thus forged to contain dense compact metal and are of maximum strength.

We have therefore provided a novel method of manufacturing axle housings from precut blanks of metal wherein adequately large flat spring seats are forged with strengthened corners.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of fabricating an axle housing center section having an intermediate arcuate differential-receiving region which comprises providing blanks of metal of desired wall thickness of the housing, hot forging the blanks to intermediate longitudinal channel shaped housing halves having rounded corners and arcuate differential-receiving regions, laterally confining the side walls of said housing halves, upsetting the outer end regions of the channel side walls while so confined to reduce the side walls in height, square the rounded corners, and thicken and compact the metal in the corner regions while simultaneously scarfing the edges of said side walls, bowing said housing halves so that when two such halves are matched and brought together the aligned scarfed, mating edges of said channels contact at their center regions and are separated slightly at their outer end regions, clamping said halves together to bring said scarfed mating edges into substantial contact along their entire length and welding the halves together along the scarfed mating edges.

2. The method defined in claim 1 including forming notches of such shape and location in the edges of the said blank before forging that, after forging and welding, said notches will be disposed in predetermined circumferential location on the inner periphery of said differential-receiving region.

3. The method defined in claim 1 wherein said simultaneous upsetting and scarfing is performed during a second hot forging step by exerting pressure on the upper edges of said channel side walls.

References Cited in the file of this patent

UNITED STATES PATENTS

| Number | Name | Date |
| --- | --- | --- |
| 109,781 | Van Patten | Nov. 29, 1870 |
| 119,643 | Prindle | Oct. 3, 1871 |
| 1,243,398 | Fries | Oct. 16, 1917 |
| 1,440,658 | Coapman | Jan. 2, 1923 |
| 1,811,590 | Holmes | June 23, 1931 |
| 1,806,558 | Holmes | May 19, 1931 |
| 1,983,584 | Urschel | Dec. 11, 1934 |
| 2,039,398 | Dye | May 5, 1936 |
| 2,124,406 | Spatta | July 19, 1938 |
| 2,377,974 | Sherman | June 12, 1945 |
| 2,480,833 | Buckendale | Sept. 6, 1949 |